United States Patent [19]

Bowen

[11] Patent Number: 5,633,318
[45] Date of Patent: May 27, 1997

[54] SYTRENIC POLYMER RESINS ACHIEVING IMPROVED GLOSS AND IMPACT RESISTANCE

[75] Inventor: Kenneth E. Bowen, Belpre, Ohio

[73] Assignee: Chevron Chemical Company, San Ramon, Calif.

[21] Appl. No.: 727,867

[22] Filed: Oct. 8, 1996

Related U.S. Application Data

[63] Continuation of Ser. No. 347,773, Nov. 30, 1994, abandoned.

[51] Int. Cl.⁶ .............................. C08L 51/04; C08L 53/02
[52] U.S. Cl. ...................... 525/71; 525/72; 525/98; 525/99
[58] Field of Search .......................... 525/71, 72, 98, 525/99

[56] References Cited

U.S. PATENT DOCUMENTS

| | | | |
|---|---|---|---|
| 3,879,491 | 4/1975 | Lindsey | 525/479 |
| 4,031,176 | 6/1977 | Molbert | 264/45.2 |
| 4,075,285 | 2/1978 | Tabana | 525/99 |
| 4,493,922 | 1/1985 | Echte | 525/71 |
| 5,039,714 | 8/1991 | Kisahara | 521/148 |
| 5,294,656 | 3/1994 | Okamoto | 524/269 |
| 5,334,658 | 8/1994 | Blumeustern | 525/71 |

FOREIGN PATENT DOCUMENTS 1077769  8/1967  United Kingdom .

*Primary Examiner*—Irina S. Zemel
*Attorney, Agent, or Firm*—T. G. DeJonghe

[57] ABSTRACT

A polystyrene based composition is provided having high impact strength and gloss. The gloss is particularly noted when the resin is molded into plastic articles, especially at relatively cooler temperatures, such as 80° F. to 100° F. The composition contains three resins. The first resin comprises polystyrene and rubber particles smaller than 1.0 micron, such as 0.2 to 0.6 microns. The second resin comprises polystyrene and rubber particles larger than 1.0 micron. The third resin preferably is a block copolymer of styrene and butadiene. Unexpectedly, the third resin improves the gloss achieved by the overall composition.

12 Claims, No Drawings

SYTRENIC POLYMER RESINS ACHIEVING IMPROVED GLOSS AND IMPACT RESISTANCE

This is a continuation of application Ser. No. 08/347,773, filed Nov. 30, 1994, now abandoned.

FIELD OF INVENTION

The present invention relates to impact resistant polystyrene based resin compositions which also have a glossy appearance after molding. More particularly, the present invention relates to a polystyrene based composition containing rubber particles of different size distribution and morphology.

BACKGROUND OF THE INVENTION

Polystyrene is well known as a leading plastic, produced on a large scale, usually in continuous polymerization plants. Modified forms of polystyrene, such as the use of butadiene based rubber to increase impact resistance of polystyrene, are also well known.

The largest area of use for polystyrene based plastics is in packaging applications, e.g., disposable tumblers, television cabinets, meat and food trays, and egg cartons. Other uses include computer cabinets and telephone equipment where a combination of high impact strength and attractive appearance, including gloss, are desirable.

Examples of references to production of high impact polystyrene polyblends, commonly called "HIPS", comprising polystyrene having a rubber phase dispersed therein, as crosslinked rubber particles, include U.S. Pat. No. 3,903,202 to Carter et al.

There are numerous, more recent examples of HIPS product containing bimodal distribution of rubber particles. U.S. Pat. No. 4,146,589 to Dupre discloses a HIPS product having rubber particles of about 0.5 to 1.0 microns and of about 2 to 3 microns. In accordance with U.S. Pat. No. 4,146,589, a preferred rubber is formed by the polymerization of 1,3-butadiene wherein the butadiene has a cis-isomer content of about 30–99.5% and a trans-isomer content of about 70–2%, and generally contain at least about 85% of polybutadiene formed by 1,4 addition with no more than about 15% by 1,2 addition.

U.S. Pat. No. 4,493,922 to Echte et al. discloses a HIPS product having bimodal rubber particle size distribution of 0.2 to 0.6 microns and particles of 2 to 8 microns. According to Echte et al., the rubber or elastomeric phase can be composed of polybutadiene or of block copolymers of butadiene and styrene. The smaller rubber particles have a so-called capsule morphology and the larger particles have a cell morphology.

Bragaw, in an article titled "The Theory of Rubber Toughening of Brittle Polymers", published in *Multicomponent Polymer Systems, Advances in Chemistry Series* 99, ACS, 1971, pp. 86–106, discusses the use of different particle sizes for a dispersed rubber phase to raise the impact strength of polystyrene.

U.S. Pat. No. 5,039,714 to Kasahara et al. discloses an impact resistant rubber modified polystyrene composition of high gloss having bimodal rubber particle size distribution of 0.1 to 0.6 microns with a single occlusion (capsule) structure and a larger particle component of 0.7 to 1.9 microns with a cellular particle structure.

U.S. Pat. No. 5,294,656 to Okamoto et al. discloses a rubber modified polystyrene based composition which is improved, compared to ABS, in balance between impact strength and appearance of shaped articles such as gloss and image clarity. According to U.S. Pat. No. 5,294,656, the polystyrene based composition has a bimodal rubber particle size distribution of (a) 0.1 to 0.4 microns having a core/shell (capsule) structure and (b) 0.8 to 2.0 microns having a cell structure, and wherein the resin contains methyl phenyl silicone oil. The rubber elastomer in U.S. Pat. No. 5,294,656 may be a polybutadiene or a styrene-butadiene copolymer.

SUMMARY OF THE INVENTION

According to the present invention, a polystyrene based composition having high impact strength and high gloss is provided. The composition comprises:

(1) a first resin comprising polystyrene and particles containing polybutadiene, wherein the particles have an average size less than 1.0 micron;

(2) a second resin comprising polystyrene and polybutadiene particles having an average particle size greater than 1.0 micron; and (3) a third resin comprising a block copolymer of styrene and an elastomer forming monomer.

Among other factors, the present invention is based on our finding that, surprisingly, the addition of the third resin to resins one and two improves the gloss of products made from the composition. Typically, the addition of block copolymer to high impact resins is expected to lower the gloss.

Especially at relatively low molding temperatures, we have found that the addition of resin three achieves an unexpected increase in gloss for articles formed from the blend of resins. Relatively low molding temperatures preferably include temperatures below 150° F., more preferably 80° F. to 100° F.

Further, we have found that impact strength of the resultant resin is greater than for a bimodal type HIPS product that would be made by blending resins one and two.

The improved gloss for the articles made from the composition of the present invention better enables this HIPS product to compete with acrylonitrile-butadiene-styrene (ABS) compositions.

The elastomer or rubber material used to make the particles of resin one of the present invention preferably comprises polybutadiene, more preferably a block copolymer of styrene and butadiene containing at least 30% polystyrene.

The elastomer used to make the particles of resin two of the present invention preferably is polybutadiene. Preferably, this polybutadiene is made from 1,3-butadiene of medium or high cis content.

The third resin of the present invention is a block copolymer of styrene and an elastomer forming monomer, rather than a two-phase system of elastomer in polystyrene. Preferred elastomer forming monomers are butadiene and isoprene, most preferably butadiene. Preferably, the third resin is a triblock copolymer of styrene-butadiene-styrene. Preferably, the butadiene is 1,3-butadiene of medium or high cis content.

The amount of resin one, in the overall blend of resins one, two and three of the present invention, is preferably 50–98 weight percent, more preferably 70–98 weight percent; the amount of resin two in the blend is preferably 1–25 weight percent, more preferably 1–15 weight percent; and the amount of resin three in the blend is preferably 1–25 weight percent, more preferably 2–15 weight percent. We have found that particularly good results are achieved for impact strength while simultaneously achieving good gloss if the amount of resin two is 10 weight percent or less.

As previously indicated, the average particle size for the elastomer particles of resin one is smaller than that for resin two. Preferably, the resin one particles are less than about 0.8 microns in the present three-resin system. Preferably, the particles in resin two have an average size between 1.0 and 4.0 microns, more preferably between 1.5 and 2.5 microns.

The rubber particles in resin one are preferably predominantly of capsule morphology, that is, having a structure of single occlusion. The larger rubber particles in resin two are preferably predominantly of cell morphology, that is, having a structure of multiple occlusions.

Preferred amounts of polybutadiene in resin one are 1 to 30 weight percent, more preferably 5 to 15 weight percent, and most preferably 7 to 11 weight percent; in resin two preferably 2 to 20 weight percent, more preferably 3 to 12 weight percent, and most preferably 5 to 10 weight percent; and in the resin three block copolymer preferably 50 to 95 weight percent, more preferably 60 to 90 weight percent, and most preferably 65 to 80 weight percent.

The composition of the present invention is advantageously used to make plastic articles formed by molding or extrusion. Preferably, the composition is used in a process to make molded articles. Articles can be molded from the composition by injection molding or compression molding techniques. With the composition of the present invention, an unexpected advantage in gloss is achieved and this advantage is especially striking at relatively cooler molding temperatures. Such cooler molding temperatures are below 150° F., and more preferably below 120° F., and still more preferably between about 80° F. and 100° F. The gloss achieved better enables the HIPS composition of the present invention to compete against ABS, especially at cooler molding temperatures.

DETAILED DESCRIPTION OF THE INVENTION

Resin one can be made by blending a styrene-butadiene diblock copolymer with polystyrene or by creating a graft copolymer using the diblock and styrene monomer. Preferably, the resulting resin contains 70–98 weight percent polystyrene, more preferably 85–95 weight percent polystyrene, and 1–30 weight percent polybutadiene, more preferably 5–15 weight percent polybutadiene. The polystyrene is typically present both as a homopolymer and as a portion of the diblock copolymer. The diblock copolymer preferably is 30 to 50 weight percent polystyrene, more preferably 35 to 45 weight percent polystyrene; and preferably 50 to 70 weight percent polybutadiene, more preferably 55 to 65 weight percent polybutadiene.

The material formed by polymerizing styrene in the presence of the diblock copolymer forms distinct rubber particles with an average diameter of preferably about 0.5 microns. The particles are preferably of the capsule type morphology.

Preferably, resin one is made by adding a styrene block copolymer to styrene monomer in the feed to a bulk polymerization process. We have found that addition of a chain transfer agent to the feed is advantageous in controlling the capsule size formed in the resultant resin. Without use of a chain transfer agent, the particle size may be too small. Preferred average particle sizes for the capsule particles of resin one are 0.1 to 1.0 microns, more preferably 0.1 to 0.8 microns, and most preferably about 0.5 microns or in the range about 0.2 to 0.6 microns. Typically, polymerization of the styrene monomer is initiated in this process thermally, although a chemical initiator may also be used for this purpose. Many known compounds can be used as a chain transfer agent such as ethylbenzene, isopropylbenzene (cumene), or a mercaptan.

Resin two, which is a rubber modified polystyrene, is preferably made by polymerizing styrene in the presence of a rubber, preferably polybutadiene. In this preferred process, the rubber is dissolved in a solution containing styrene and possibly a solvent. The addition of heat and/or an initiator causes polymerization of the styrene, whereby many of the polystyrene chains are grafted to (attached to) the rubber. The resultant rubber modified polystyrene has improved impact strength but also typically has reduced clarity, reduced softening point, and reduced tensile strength.

A preferred process to make this material uses three polymerization reactors. Each reactor has several heating zones. The reaction temperature is progressively increased in the three reactors from about 110° C. at the inlet to the first reactor to about 170° C. at the outlet of the third reactor. The styrene monomer, dissolved rubber, solvent (about 3–12% ethylbenzene), and initiator are fed into the reactor train. The resultant polymer solution then has the residual monomer and solvent removed in a devolatization vessel at about 230° C. The molten polymer is then reextruded, cooled and pelletized.

Alternatively, resin two can be made in a bulk polymerization plant without a solvent. The rubber (medium or high cis-polybutadiene have been found to work well) is added to the styrene monomer which is fed to a bulk polymerization process. An initiator may be used or the reaction can be initiated thermally. Typical initiators include t-butyperoxybenzoate and benzoylperoxide. A chain transfer agent may be used but is not necessary to give consistent large rubber particle size in the resultant resin which is a graft copolymer.

In the present invention, preferably resin two is made such that the rubber particles are greater than 1.0 microns in diameter, more preferably 1.0 to 4.0 microns, and preferably of the "cell" or "cigar" morphology. Resin two preferably contains between 75 and 97 weight percent polystyrene, more preferably between 82 and 95 weight percent polystyrene; and preferably between 3 and 12 weight percent polybutadiene, more preferably between 5 and 10 weight percent polybutadiene.

Resin three is a styrene block copolymer where the hard blocks (polymer segments) are formed preferably from styrene units. The soft blocks are from elastomer forming monomers, butadiene, isoprene, ethylene butylene, ethylene propylene, other rubber units, or mixtures of the above monomers.

The resultant resins may also be hydrogenated to reduce double bonds in the polymer.

Preferred styrene block copolymers for use in this invention include styrene butadiene styrene (SBS), styrene isoprene styrene (SIS), and styrene ethylenebutylene styrene (SEBS) which are triblock copolymers. SBS is particularly preferred. Such polymers are available commercially under tradenames such as Kraton (Shell), Stereon (Firestone), Tufprene (Asahi), Europrene Sol T (Enichen), Elexar (Shell), and C-Flex (Concept Polymers).

Resin three preferably contains 5 to 50 weight percent polystyrene, more preferably 10 to 40 weight percent polystyrene; and preferably 50 to 95 weight percent polybutadiene, more preferably 60 to 90 weight percent polybutadiene.

The blocks in styrene block copolymer may be directly attached to one another or may have a transitional, intermediate, section known as taper. The taper is an area of the molecule between the blocks where both monomer units are present, similar to a random copolymer. For example, in a styrene-butadiene (SB) block copolymer, there may be a region of styrene units, then a region of styrene units and some butadiene units where the butadiene units become more and more numerous the closer one gets to the butadiene region which is the third region.

Preferred particle sizes for the rubber particles in the resins of the blend of the present invention are briefly summarized in Table 1 below.

TABLE 1

PREFERRED PARTICLE SIZES

|  | Resin One Polybutadiene Microns | Resin Two Polybutadiene Microns | Resin Three Styrene Block Copolymer Microns |
| --- | --- | --- | --- |
| Preferred Range | <1 | >1 | 0.8–4.0 |
| More Preferred Range | 0.1–0.8 | 1–4 | 1.2–3.0 |
| Most Preferred Range | about 0.5, or 0.2–0.6 | 1.5–2.0 | 1.5–2.5 |

Preferred amounts of the resins in the blend of the present invention are briefly summarized in Table 2 below.

TABLE 2

PREFERRED RANGES OF COMPONENTS FOR THE BLEND

|  | Resin One wt. % | Resin Two wt. % | Resin Three wt. % |
| --- | --- | --- | --- |
| Preferred | 50–98 | 1–25 | 1–25 |
| More Preferred | 70–98 | 1–15 | 2–15 |
| Most Preferred | 85–95 | 2–10 | 2–10 |

In this invention, average particle size is determined using Transmission Electron Microscopy (TEM). TEM has been found to be a more consistent and accurate method for determining particle size in these resins in part because other analytical techniques, such as laser light scattering, employ the use of solvents. It has been found that the solvent can cause swelling of the rubber particles or even dissolve the styrene block copolymer causing inaccuracies in the measurements. The average particle sizes are determined using transmission electron micrographs of ultra-thin slices of the materials. The average size for the three particle types are measured separately. Therefore, the styrene block copolymer particles, the cell particles from the resin two rubber, and the single occlusion particles from resin one are all treated independently. These three particle types have distinctively different appearances which are recognizable in the TEM image. The small particles from resin one are mostly single occlusion capsule particles. The particles from resin two are mostly larger "brain" or "cell"-like particles within which are defined cells (when the slice is properly stained). The styrene block copolymer forms separate large particles that are different in appearance from the "brain", in that they do not contain cells and are often darker in shading due to the staining.

Particle size measurement is accomplished by (1) overlaying a transparency containing straight lines on a TEM photograph of the resin, (2) measuring the total length of the line segments contained inside particles of a given type, and (3) counting the number of particles intersected. This process is repeated for as many lines as is necessary to give a reasonably good statistical average. The following formula is then used to calculate average particle size:

$$\text{Average Particle Size} = \frac{\text{total length of segments bisected}}{\text{number of particles intersected}}$$

This method gives an average particle size even for particles that are not spherical.

An alternate method to determine an average particle diameter is similar to the above but assumes the particles are spherical. It involves measuring the particle size distribution of 500 particles of a given particle type from the transmission electron micrograph(s) of an ultra-thin specimen. A histogram of the sizes is developed, then the following formula is used to compute the mean particle diameter:

$$\text{Mean particle diameter} = \frac{\Sigma n_i D_i^2}{\Sigma n_i D_i}$$

where $n_i$ is the number of the soft particles having size $D_i$.

A reference for these measurement methods is *Quantative Microscopy* by R. T. Dehoff and F. N. Rhines, Techbooks, 1968.

EXAMPLES

Pellets of the three resins were fed into an extruder in the proper ratio. The pellets were melted and reextruded as a blend of the three materials. The blend contained the following:

| Resin One | 88.9 weight percent |
| --- | --- |
| Resin Two | 3.7 weight percent |
| Resin Three | 7.4 weight percent |

Resin One was a rubber modified polystyrene consisting of 90.5% polystyrene and 9.5% polybutadiene. The polybutadiene was dispersed in the polystyrene matrix in capsule-type rubber particles with an average diameter of 0.5 microns.

Resin Two was also a rubber modified polystyrene material. It contained 93.5% polystyrene and 6.5% polybutadiene. The polybutadiene in this resin was in cell-type rubber particles with an average diameter of 1.9 microns.

Resin Three was a styrene-butadiene-styrene triblock copolymer. The polybutadiene portion of the triblock was 72% by weight.

The resultant three-component resin had higher gloss and higher impact strength than either standard high gloss HIPS (high impact polystyrene) or a bimodal HIPS blend of resin one and resin two in a ratio of (93:7) without the SBS triblock. The table below compares the key physical properties of the three-component resin to the bimodal HIPS and standard HIPS:

|  | 3 Compound Resin | Bimodal HIPS | Standard High Gloss HIPS |
|---|---|---|---|
| Gloss 150° F. mold (%) | 98 | 96 | 90 |
| Gloss 100° F. mold % | 89 | 72 | 55 |
| Gardner Impact (in lbs) | 240 | 215 | 50 |

The above illustrates that the addition of the styrene-butadiene block copolymer gave an unexpected increase in gloss as well as better impact resistance, whereas it was anticipated that addition of the block copolymer would decrease the gloss as it does when it is added to standard high gloss HIPS. Further, the advantage in gloss was found to be more striking at the relatively low molding temperature of 100° F. compared to 150° F. molding temperature.

The gloss measurements were done as follows. Four-inch diameter plaques were injection molded on a Van Dorn™ injection molding machine. The conditions used are shown below:

| Injection Pressure | 1100 psi |
|---|---|
| Hold Pressure | 700 psi |
| Back Pressure | 175 psi |
| Heating Zones | |
| Front | 400° F. |
| Nozzle | 400° F. |
| Center | 400° F. |
| Rear | 400° F. |
| Mold Temperature | 150° F. for high mold temperature condition. |
| | 100° F. for low mold temperature condition. |
| Melt Temperature | 440° F. |

The 60° Gardner gloss was then determined using a BYK Gardner Haze-Gloss instrument according to ASTM D523.

The impact measurements were done as follows. Four-inch plaques were injection molded as described above. Gardner impact was measured using a Gardner Heavy Duty Impact Tester Model IG-1120, using a four-pound weight and a ½-inch diameter, hardened steel, round-nosed punch. The removable ring in the tester anvil was left in for the testing. The testing is carried out in accordance to ASTM D3029 Method G.

What is claimed is:

1. A polystyrene based composition having high impact strength and high gloss, comprising:
   (a) a first resin comprising polystyrene and particles containing polybutadiene, wherein the particles have an average size less than 1.0 micron, and the polybutadiene content in the first resin is between 5 to 15 weight percent of the first resin;
   (b) a second resin comprising polystyrene and polybutadiene particles having an average particle size greater than 1.0 micron, and the amount of polybutadiene in the second resin is between 3 to 12 weight percent of the second resin; and
   (c) a third resin comprising a block copolymer of styrene and butadiene having a butadiene content of 65 to 80 weight percent.

2. A composition in accordance with claim 1 wherein the particles in resin one comprise a styrene-butadiene block copolymer.

3. A composition in accordance with claim 1 wherein the third resin is a triblock styrene-butadiene-styrene copolymer.

4. A composition in accordance with claim 3 wherein:
   (a) the amount of the first resin is 50–98 weight percent of the composition;
   (b) the amount of the second resin is 1–25 weight percent of the composition; and
   (c) the amount of the third resin is 1–25 weight percent of the composition.

5. A composition in accordance with claim 3 wherein:
   (a) the amount of the first resin is 70–98 weight percent of the composition;
   (b) the amount of the second resin is 1–10 weight percent of the composition; and
   (c) the amount of the third resin is 2–15 weight percent of the composition.

6. A composition in accordance with claim 3 wherein the average particle size of the polybutadiene in the first resin is less than 0.6 microns.

7. A composition in accordance with claim 6 wherein the polybutadiene in the second resin has an average particle size between about 1.0 and 4.0 microns.

8. A process for making molded articles wherein the composition of claim 1 is molded at a mold temperature below 150° F.

9. A process in accordance with claim 8 wherein the mold temperature is below 120° F.

10. A process in accordance with claim 8 wherein the mold temperature is 80°–100° F.

11. A composition in accordance with claim 1 wherein the third resin has a butadiene content of about 72% by weight.

12. A process for making molded articles wherein the composition of claim 11 is molded at a mold temperature of below 120° F.

* * * * *